United States Patent
Goud et al.

(10) Patent No.: US 7,143,279 B2
(45) Date of Patent: Nov. 28, 2006

(54) DYNAMIC BIOS EXECUTION AND CONCURRENT UPDATE FOR A BLADE SERVER

(75) Inventors: Gundrala D. Goud, Olympia, WA (US); Sandip M. Hiray, Federal Way, WA (US)

(73) Assignee: Intel Corporation, Santa Clara, CA (US)

( * ) Notice: Subject to any disclaimer, the term of this patent is extended or adjusted under 35 U.S.C. 154(b) by 510 days.

(21) Appl. No.: 10/448,696

(22) Filed: May 29, 2003

(65) Prior Publication Data

US 2004/0243798 A1 Dec. 2, 2004

(51) Int. Cl.
G06F 9/445 (2006.01)

(52) U.S. Cl. ............... 713/2; 713/1; 713/100

(58) Field of Classification Search ........... 713/1, 713/2, 100; 711/162
See application file for complete search history.

(56) References Cited

U.S. PATENT DOCUMENTS

| | | | |
|---|---|---|---|
| 5,835,761 A | 11/1998 | Ishii et al. | |
| 6,098,158 A * | 8/2000 | Lay et al. | 711/162 |
| 6,757,838 B1 * | 6/2004 | Chaiken et al. | 714/5 |
| 6,944,826 B1 * | 9/2005 | Thornton | 715/733 |
| 6,968,414 B1 * | 11/2005 | Abbondanzio et al. | 710/301 |
| 2002/0124114 A1 * | 9/2002 | Bottom et al. | 709/251 |
| 2003/0074431 A1 | 4/2003 | Abbondanzio et al. | |
| 2003/0074434 A1 | 4/2003 | Abbondanzio et al. | |
| 2003/0097487 A1 | 5/2003 | Rietze et al. | |
| 2004/0236938 A1 | 11/2004 | Bulusu | |
| 2004/0260936 A1 | 12/2004 | Hiray | |
| 2005/0071623 A1 | 3/2005 | Zimmer | |
| 2005/0076107 A1 | 4/2005 | Zimmer | |

FOREIGN PATENT DOCUMENTS

EP 0479427 A2 8/1991

OTHER PUBLICATIONS

Qian A: "updating BIOS and Frimware on a Group of Servers" Internet Article, 'Online! May 2002, XP00229550 Retrieved from the Internet: <URL: http//www1.us.dell.com/content/topics/global.aspx/power/en/ps2q02_quian?c=us&cs=RC968571&l=en &s=hea> 'retrieved on Sep. 8, 2004! p. 1-p. 4.
PCT Search Report Dated Nov. 5, 2004.
EP Application No. 04 785 644.8—EP Office Action dated Mar. 13, 2006.
U.S. Appl. No. 11/009,891, filed Dec. 10, 2004, Zimmer.

* cited by examiner

Primary Examiner—Thomas Lee
Assistant Examiner—Hari Patel
(74) Attorney, Agent, or Firm—Justin B. Scout

(57) ABSTRACT

The present disclosure relates to retrieving and executing a Basic Input Output System (BIOS) image that is divided into at least two parts and, more particularly, to retrieving and executing a BIOS image in a blade server environment utilizing a service processor and a blade management agent.

49 Claims, 2 Drawing Sheets

DYNAMIC BIOS EXECUTION AND CONCURRENT UPDATE FOR A BLADE SERVER

BACKGROUND

1. Field

The present disclosure relates to retrieving and executing a Basic Input Output System (BIOS) image that is divided into at least two parts and, more particularly, to retrieving and executing a BIOS image in a blade server environment utilizing a service processor and a blade management agent.

2. Background Information

Typically, the operation of a computer or processing system (hereafter, "computer") may be divided into two stages, pre-boot and runtime. The pre-boot process or phase often comprises starting or resetting a computer. When first turned on (cold boot) or reset/rebooted (warm boot), a computer executes the software that loads and starts the computer's operating system and prepares it for use. This software is typically referred to as a Basic Input Output System (BIOS). Thus, the computer can be said to pull itself up by its own bootstraps. The runtime process or phase often occurs after the pre-boot phase and includes the execution of an operating system and other user applications. The runtime phase is typically the phase that users interact with the computer. Thus, the computer can be said to being running application programs. It is contemplated that a computer or processing system includes devices, such as, for example, mobile or stationary computers, personal digital assistants, telecommunication devices and/or similar devices that each include a processor, a storage medium readable or accessible by the processor (including volatile and non-volatile memory and/or storage elements).

A blade architecture is a variation on the computer server architecture. Typically in a blade architecture, a blade card (also referred to as a "blade") may be a single board which contains the core components of a server. These core components may include devices, such as, for example, a chipset, a processor and a Basic Input Output System (BIOS) image; however, these are merely a few non-limiting examples. A number of these blade cards are often designed to be housed in a chassis that provides access to a number of shared resources, such as, for example, power, cooling, network access, input device(s), and video output(s); however, again these are merely a few non-limiting examples. The number of blade cards are often provided access to the shared resource via a chassis backplane.

The blade architecture allows a number of servers, on the blade cards, to be housed with a single chassis; whereas, a more traditional server architecture would only allow one server to be housed within a chassis. Blade cards typically may be easily installed and removed from the chassis. Generally, all of the blade cards in a blade server (the chassis and collation of blade cards) independently boot an operating system.

Often in order to update the BIOS of a server's blade card the particular blade card is rebooted into a service partition and a flash update utility is executed. This may copy the new BIOS from the service partition, or other storage medium, onto the blade card. Another technique to update the BIOS of a blade card involves utilizing a special BIOS recovery mechanism. The current techniques require that the entire blade server be effectively "off-line" as an individual blade card is updated. This is because the updated blade card must has sole access to the server's shared resources, preventing the other blade cards from utilizing the shared resources. Furthermore, each individual blade card must be updated separately. This serial updating of the blade card BIOS generally involves a great deal of time. Also, the blade cards of the server may not be homogeneous and may require different BIOS images. Therefore, a system administrator would have to handle a number of versions of BIOS images during the updating process. A need, therefore, exists for an improved system or technique for retrieving and executing a BIOS image.

BRIEF DESCRIPTION OF THE DRAWINGS

Subject matter is particularly pointed out and distinctly claimed in the concluding portions of the specification. The disclosed subject matter, however, both as to organization and the method of operation, together with objects, features and advantages thereof, may be best understood by a reference to the following detailed description when read with the accompanying drawings in which:

DETAILED DESCRIPTION

In the following detailed description, numerous details are set forth in order to provide a thorough understanding of the present disclosed subject matter. However, it will be understood by those skilled in the art that the disclosed subject matter may be practiced without these specific details. In other instances, well-known methods, procedures, components, and circuits have not been described in detail so as to not obscure the disclosed subject matter.

Figure 1:
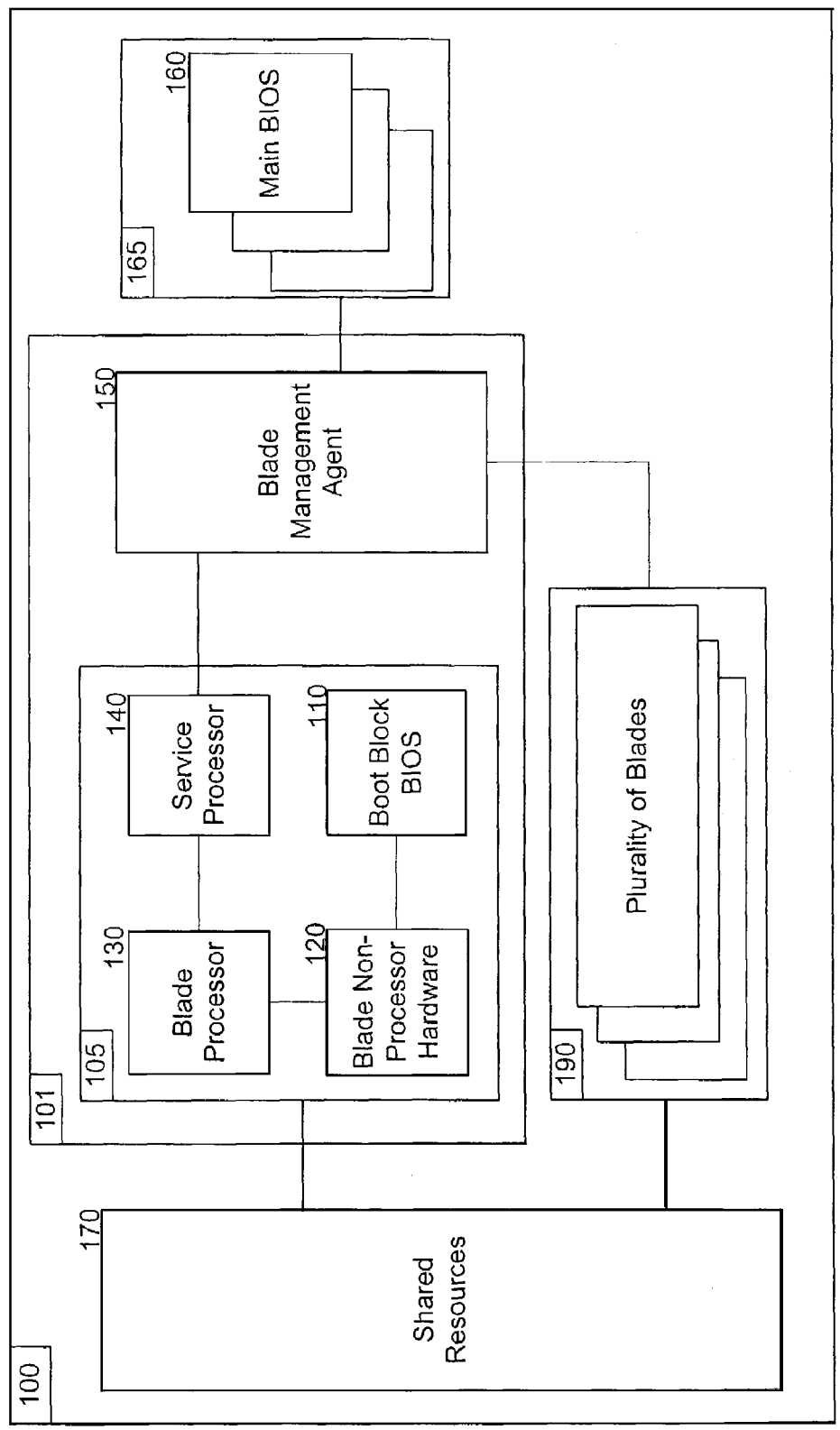
FIG. 1 is a block diagram illustrating an embodiment of an apparatus and a system that allows retrieval and execution of a BIOS image in accordance with the disclosed subject matter.

FIG. 1 is a block diagram illustrating an embodiment of an apparatus 101 and a system 100 that allows retrieval and execution of a BIOS image in accordance with the disclosed subject matter. In one embodiment, the apparatus 101 may include a blade card 105 and a blade management agent 150. The blade card may include a blade processor 130 and a service processor 140. The primary function of the blade processor may be to execute instructions during the runtime phase of blade card operation. In some embodiments, the blade processor may be a microprocessor, such as, for example, a Pentium, Itanium, or PowerPC; however, these are merely a few non-limiting illustrative examples. The service processor, conversely, may have a function of assisting the blade card to execute the pre-boot phase of operation. In some embodiments, the service processor may be a processor with less capability than the blade processor, such as, for example, a i960, or an X-Scale processor; however, these are merely a few non-limiting illustrative examples. It is contemplated that in some embodiments, the blade processor and the service processor may be embodied within a single processor. It is further contemplated that in some embodiments of the system, a central service processor may be shared amongst a plurality of blade cards.

The blade card 105 may also include blade non-processor hardware 120. In one embodiment the non-processor hardware may include a chipset and various types of memory; however, these are merely a few non-limiting illustrative examples.

The blade card may include a boot block BIOS portion 110. This boot block BIOS may facilitate the basic non-processor hardware 120 initialization during the pre-boot phase of operation. In one embodiment, this boot block BIOS portion may be a smaller portion of the traditional BIOS. In this embodiment, the traditional BIOS may be bifurcated into a boot block portion and a main BIOS portion 160. The boot block BIOS portion may be of a minimum size to perform the required initialization operations. It is contemplated that the boot block BIOS portion may be stored within a firmware or other non-volatile memory structure. It is further contemplated that, in one embodiment, this firmware may be smaller than necessary to store a traditional BIOS image.

It is further contemplated that the boot block BIOS portion may include a "rolling BIOS" format. A rolling BIOS format may allow multiple versions of the boot block BIOS portion to be stored within a single firmware image. The particular version of the boot block BIOS portion may then be selected at boot-up. For example, in one embodiment, an old version of the boot block BIOS portion may be saved, but marked as inactive, when a new version of the boot block BIOS portion is stored or updated. Upon attempting to execute the newer version of the boot block BIOS portion, it may fail to execute. The blade card 105 may then attempt to revert to or execute the older version of the boot block BIOS portion. In this embodiment, the reliability of the system 100 or apparatus 101 may be increased by having multiple boot block BIOS portions to choose from. However, it is contemplated that other reasons or advantages to utilizing a multiple boot block BIOS portion embodiment may exist. It is also contemplated that other embodiments of multiple boot block BIOS portions may be used besides the illustrative example of the rolling BIOS.

Once the basic functionality of the blade card 105 or non-processor hardware 120 has been initialized, the service processor 140 may request the second or main portion of the BIOS from the blade management agent 150. The blade management agent may provide the blade card 105 with a main BIOS portion 160.

This main BIOS portion 160, in one embodiment, may provide the capability to perform the operations of the traditional BIOS not provided by the boot block BIOS portion 110. Such operations may include, but are not limited to, completing the Power-On Self-Test (POST), complex hardware initialization, virus scanning functionality, initializing the blade processor 130, booting the operating system, etc. It is contemplated that, in one embodiment, the main BIOS portion may be the second half of the bifurcated traditional BIOS. However, it is contemplated that the traditional BIOS may not be equally divided. It is also contemplated that the boot block BIOS portion and main BIOS portion may provide functionality, for example, greater than, less than, or possibly, radically different than the traditional unified BIOS. It is also contemplated that the main BIOS portion may include a plurality of smaller BIOS portions.

In one embodiment, the blade management agent 150 may select a main BIOS portion 160 from a number or plurality of main BIOS portions 165. For example, the system 100 may include a plurality of blade cards 190 & 105, a number of shared resources 170, a blade management agent, and a plurality of main BIOS portions. In one embodiment, each of the plurality of blade cards may include substantially different hardware, such as for example, a different chipset, brand of processor, or amount of memory. Therefore, each blade card may utilize a different main BIOS portion. The blade management agent may be capable of selecting which main BIOS portion to provide to each blade card. However, this is merely one non-limiting example, other examples may include selecting a main BIOS portion based upon criteria, such as, for example, a pre-defined value, the success of a previous pre-boot phase, a date associated with a main BIOS portion, or a hardware signature of the requesting blade card. It is contemplated that other criteria may be used in different embodiments of the disclosed subject matter.

It is contemplated that the blade management agent 150 may retrieve the main BIOS portions 165 from a number of locations or storage mediums, such as, for example, a remote secure server, a removable disk, a non-removable disk, or a network interface; however, these are merely a few non-limiting examples. The blade management agent may allow the main BIOS portions to be altered during the runtime phase of blade card operation. It is contemplated that the changes in the main BIOS portions would then become effective on the blade card during the next booting of the blade card. However, a technique to affect a runtime change to the blade card is contemplated.

In one embodiment, a system administrator may update the main BIOS portions for multiple blade cards without taking the system 100 off-line as required by the previous method. The system may continue to operate normally and the individual blade cards updated or affected with the new main BIOS portions during the next boot of the system. Furthermore, it is contemplated that the service processor 140 may allow the boot block BIOS portion to be updated during the runtime operation of the blade card in a similar manner.

In one embodiment, the service processor 140 may verify or authenticate the main BIOS portion 160 received from the blade management agent 150. It is contemplated that the blade processor 130 may authenticate a number of properties, such as, for example, it may confirm that the main BIOS portion has not been tampered with, does not contain malicious code, is appropriate for the blade card, or has successfully booted the blade card; however, these are merely a few non-limiting examples and other examples are possible. It another embodiment, the blade management agent may perform some or all authentication operations. In one embodiment, the blade processor may be capable of loading an alternate main BIOS portion from an alternate source if the main BIOS portion provided from the blade management agent fails to authenticate. In another embodiment, the service processor may inform the blade management agent of the failure and the blade management agent may supply an alternate main BIOS portion. It is contemplated that, in one embodiment, the service processor may retrieve the alternate main BIOS portion from the blade card, possibly from a firmware on the card; however, this is merely one non-limiting example and other sources are contemplated and within the scope of the disclosed subject matter.

Figure 2:
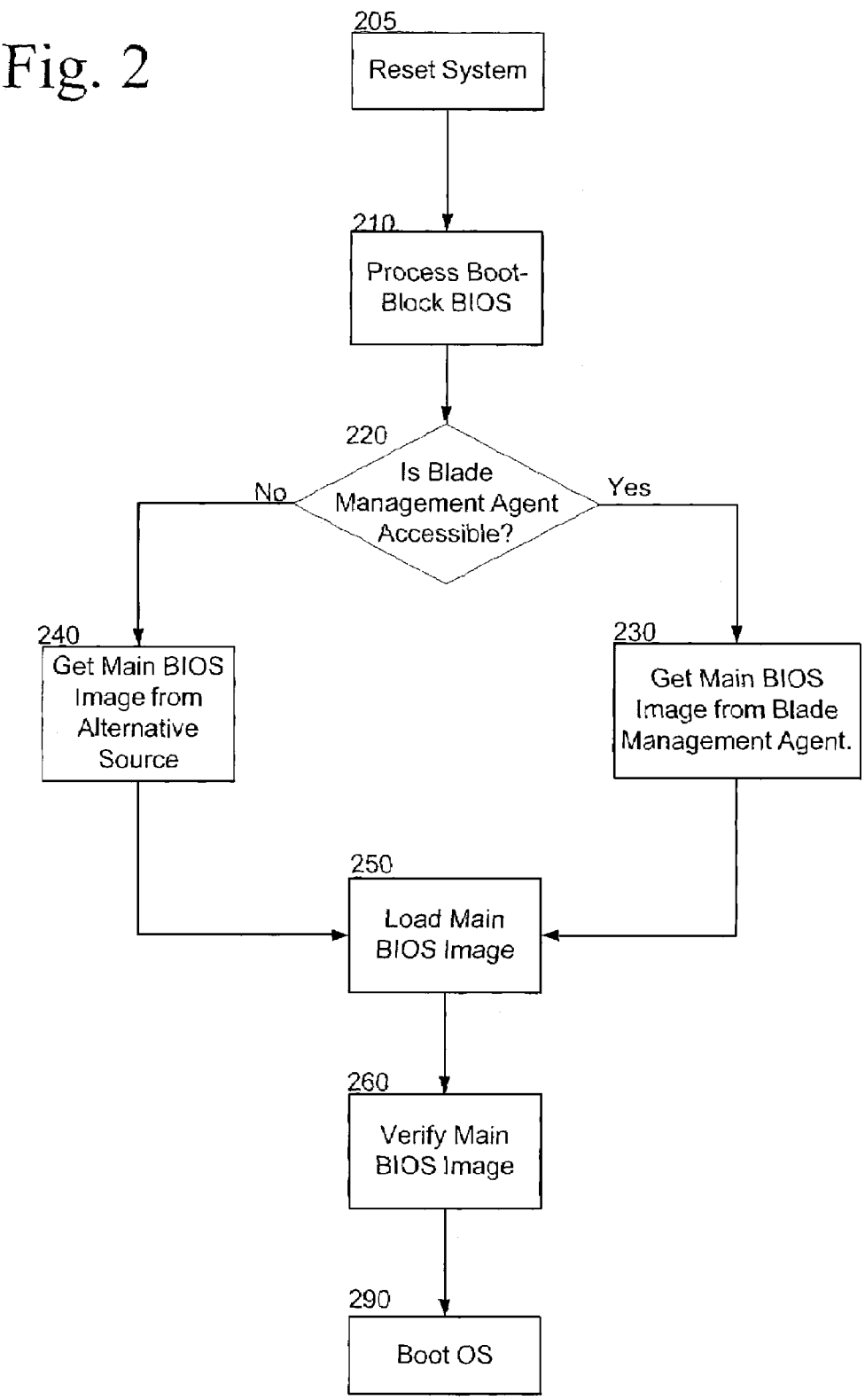
FIG. 2 is a flowchart illustrating an embodiment of a technique for retrieving and executing of a BIOS image in accordance with the disclosed subject matter.

FIG. 2 is a flowchart illustrating an embodiment of a technique for retrieving and executing a BIOS image in accordance with the disclosed subject matter. In one embodiment, the technique may include block 205 that illustrates that the system may be reset, and block 290 that illustrates the booting of the operating system (OS). In short, it is contemplated that one embodiment of the disclosed subject matter may occur during the pre-boot phase (i.e., between block 205 and block 290). However, the disclosed subject matter is not limited to the pre-boot phase and performing a portion of the technique during the runtime phase is contemplated. It is further contemplated that the technique illustrated by FIG. 2 is not limited to any particular device or class of devices, such as, for example a blade server. It is contemplated that the technique may be employed on any processing system that utilizes an initialization phase.

Block 210 illustrates that, in one embodiment, the blade card or computer may process a boot block BIOS portion to initialize the basic functionality of the system. It is contemplated that the boot block BIOS portion may be stored locally and include the features described above in reference to the boot block BIOS portion 110 of FIG. 1.

Block 220 of FIG. 2 illustrates that, in one embodiment, an attempt may be made to communicate with a blade management agent. This communication may facilitate the accessing of a main BIOS portion; however, some other embodiments of the disclosed subject matter may not utilize a blade management agent. It is further contemplated that a service processor may be utilized to communicate with the blade management agent. If the blade management agent is accessible, block 230 illustrates that a main BIOS portion may be retrieved from the blade management agent. It is contemplated that the blade management agent may select a main BIOS portion from a plurality of main BIOS portions. This selection or retrieval may, in one embodiment, may be similar to that described above in reference to the system 100 of FIG. 1.

In another embodiment, block 240 of FIG. 2 illustrates that the main BIOS portion may be retrieved from an alternative source other than the blade management agent. In one embodiment, the alternate source may be used because the main BIOS portion supplied by the blade management agent was not sufficient, for whatever reason; however, it is contemplated that other reasons for utilizing an alternate source may be considered. In one embodiment, the alternate source may be a local firmware.

Block 250 illustrates that, in one embodiment, the main BIOS portion may be loaded. In a specific embodiment, a blade processor may load the main BIOS portion into a local memory device. However, other loading mechanisms and techniques are within the scope of the disclosed subject matter. Once loaded, the main BIOS portion may be run or executed and may initialize the remained of the system.

Block 260 illustrates that, in one embodiment, the main BIOS portion may be verified or authenticated. In one embodiment, the authentication may involve a technique described above in reference to FIG. 1. In a specific embodiment, a signature associated with the main BIOS portion may be verified. If the verification fails, an alternate main BIOS portion may be loaded. However, this is one specific example and other verification techniques are contemplated.

Block 290 illustrates that the main BIOS portion may substantially complete execution and the operating system of the device or system may be booted and the pre-boot phase terminated.

The techniques described herein are not limited to any particular hardware or software configuration; they may find applicability in any computing or processing environment. The techniques may be implemented in hardware, software, firmware or a combination thereof. The techniques may be implemented in programs executing on programmable machines such as mobile or stationary computers, personal digital assistants, and similar devices that each include a processor, a storage medium readable or accessible by the processor (including volatile and non-volatile memory and/or storage elements), at least one input device, and one or more output devices. Program code is applied to the data entered using the input device to perform the functions described and to generate output information. The output information may be applied to one or more output devices.

Each program may be implemented in a high level procedural or object oriented programming language to communicate with a processing system. However, programs may be implemented in assembly or machine language, if desired. In any case, the language may be compiled or interpreted.

Each such program may be stored on a storage medium or device, e.g. compact read only memory (CD-ROM), digital versatile disk (DVD), hard disk, firmware, non-volatile memory, magnetic disk or similar medium or device, that is readable by a general or special purpose programmable machine for configuring and operating the machine when the storage medium or device is read by the computer to perform the procedures described herein. The system may also be considered to be implemented as a machine-readable or accessible storage medium, configured with a program, where the storage medium so configured causes a machine to operate in a specific manner. Other embodiments are within the scope of the following claims.

While certain features of the disclosed subject matter have been illustrated and described herein, many modifications, substitutions, changes, and equivalents will now occur to those skilled in the art. It is, therefore, to be understood that the appended claims are intended to cover all such modifications and changes that fall within the true spirit of the disclosed subject matter.

What is claimed is:

1. An apparatus comprising:
 a blade card having:
  a blade processor to, during at least a runtime phase, process instructions;
  at least one blade non-processor hardware device; and
  a service processor to facilitate the loading of a non-unified BIOS (the BIOS); and
 a blade management agent to provide the service processor with at least a portion of the BIOS;
 wherein the non-unified BIOS includes:
  a boot block BIOS portion to at least partially initialize the blade non-processor hardware device: and
  a main BIOS portion to complete a pre-boot phase.

2. The apparatus of claim 1, wherein the blade management agent is capable of providing the service processor with the Main BIOS portion.

3. The apparatus of claim 2, wherein the blade management agent is capable of selecting a main BIOS portion from a plurality of main BIOS portions.

4. The apparatus of claim 2, wherein the blade management agent is capable of providing the main BIOS portion to a plurality of blade cards.

5. The apparatus of claim 3, wherein the blade management agent is capable of selecting a main BIOS portion based upon a criteri on selected from a group consisting of the following:
 the success of a previous pre-boot phase;
 a date associated with the main BIOS portion; and
 a hardware signature of the blade card.

6. The apparatus of claim 2, wherein the blade management agent is capable of loading the main BIOS portion from a device selected from a group consisting of the following:
 a remote secure server,
 a removable disk;
 a non-removable disk; and
 network accessible storage device.

7. The apparatus of claim 1, wherein the blade card further includes:

a firmware to store the boot block BIOS portion; and
where the service processor arid the firmware are coupled so as to facilitate the loading main BIOS portion after the boot block BIOS portion has completed execution.

8. The apparatus of claim 7, wherein the blade card further includes a plurality of boot block BIOS portions and the blade processor is capable of selecting a boot block BIOS portion from the plurality of boot block BIOS portions to initialize the blade card.

9. The apparatus of claim 8, wherein the blade processor is capable of selecting which boot block BIOS portion to select based at least in part upon the success of a previous pre-boot phase.

10. The apparatus of claim 1, wherein the service processor is capable of authenticating the portion of the BIOS provided by the blade management agent, before loading the portion of the BIOS.

11. The apparatus of claim 10, wherein the service processor is capable of loading an alternate portion of the BIOS if the portion provided by the blade management agent fails to load.

12. The apparatus of claim 1, wherein the blade processor is capable of verifying the validity of the BIOS portion provided by the service processor or the blade management agent.

13. A system comprising:
a plurality of blade cards, each having:
    a blade processor to, during at least a runtime phase, process instructions,
    at least one blade non-processor hardware,
    at least one boot block BIOS portion to at least partially initialize at least the blade non-processor hardware, and
    a service processor to facilitate the loading of a BIOS;
a plurality of shred resources which are capable of being utilized by the plurality of blade cards;
a blade management agent to provide the service processor with a main BIOS portion; and
the main BIOS portion to facilitate completion of a pre-boot phase.

14. The system of claim 13, wherein the blade management agent is capable of selecting a main BIOS portion from a plurality of main BIOS portions.

15. The system of claim 14, wherein the blade management agent is capable of providing a different main BIOS portion to each of the plurality of blade cards.

16. The system of claim 14, wherein the blade management agent selects the main BIOS portion based at least in part upon a criteri on selected from a group consisting of the following:
    the success of a previous pre-boot phase;
    a date associated with the main BIOS portion; and
    a hardware signature associated with a blade card.

17. The system of claim 14, wherein the blade management agent is capable of loading the main BIOS portion from a device selected from a group consisting of the following:
    a remote secure server;
    a removable disk;
    a non-removable disk; and
    a network accessible storage device.

18. The system of claim 14, wherein the service processor and the boot block BIOS portion are coupled so as to load the main BIOS portion after the boot block BIOS portion has substantially completed execution.

19. The system of claim 18, wherein the blade card further includes a plurality of boot block BIOS portions; and the service processor is capable of selecting a boot block BIOS portion from the plurality of boot block BIOS portions to initialize at least a portion of the blade card.

20. The system of claim 19, wherein the service processor is capable of selecting which boot block BIOS portion based least in part upon the success of a previous pre-boot phase.

21. The system of claim 13, wherein the service processor is capable of authenticating the portion of the BIOS provided by the blade management agent, before loading the portion of the BIOS.

22. The system of claim 21, wherein the service processor is capable of loading an alternate portion of the BIOS if the portion provided by the blade management agent fails to load.

23. The system of claim 13, wherein the blade management agent is capable of verifying the validity of the BIOS portion provided to the service processor.

24. The system of claim 13, wherein the main BIOS portion is capable of being altered while the plurality of blade cards is in the runtime phase.

25. The system of claim 24, wherein the service processor is capable of updating the boot block BIOS portion of an individual blade card while the blade card is operating in the runtime phase.

26. A method comprising:
processing a boot block BIOS portion of a bifurcated BIOS for initializing the basic functionality of a non-processor hardware, wherein the bifurcated BIOS includes the boot block BIOS portion and a main BIOS portion;
accessing the main BIOS portion; and
loading the main BIOS portion to complete a pre-boot stage.

27. The method of claim 26, wherein the boot block BIOS portion is stored within a firmware.

28. The method of claim 27, wherein processing the boot block BIOS portion includes selecting the boot block BIOS portion from a plurality of boot block BIOS portions.

29. The method of claim 28, wherein selecting the boot block BIOS portion includes selecting a boot block BIOS portion based at least in part upon the success of a previous pre-boot phase.

30. The method of claim 26, wherein accessing the main BIOS portion includes:
    utilizing a service processor to communicate with a blade management agent; and
    getting the main BIOS portion from the blade management agent.

31. The method of claim 30, wherein accessing the main BIOS portion further includes getting the main BIOS portion from an alternative source if a valid main BIOS portion is not provided by a blade management agent.

32. The method of claim 31, wherein the alternative source includes a firmware.

33. The method of claim 30, wherein getting the main BIOS portion from the blade management agent includes the blade management agent selecting a main BIOS portion from a plurality of main BIOS portions.

34. The method of claim 33, wherein selecting the main BIOS portion includes loading the main BIOS portion from a device selected from a group consisting of the following:
    a remote secure server;
    a removable disk;
    a non-removable disk; and
    a network storage device.

35. The method of claim 33, wherein selecting a main BIOS portion includes selecting based at least in part upon a criteri on selected from a group consisting of the following:
the success of a previous pre-boot phase;
a date associated with the main BIOS portion; and
a hardware signature associated with a blade card.

36. The method of claim 26, wherein loading the main BIOS portion includes:
utilizing a service processor to load the main BIOS portion into a local memory device; and
running the main BIOS portion from the memory.

37. The method of claim 36, wherein utilizing a service processor includes:
verifying that the main BIOS portion is valid by checking a signature associated with the main BIOS portion; and
if the main BIOS portion is not valid, loading an alternative main BIOS portion.

38. An article comprising:
a storage medium having a plurality of machine accessible instructions, wherein when the instructions are executed, the instructions provide for:
processing a boot block BIOS portion of a bifurcated BIOS for initializing the basic functionality of a non-processor hardware, wherein the bifurcated BIOS includes the boot block BIOS portion and a main BIOS portion;
accessing the main BIOS portion; and
loading the main BIOS portion to complete a pre-boot phase.

39. The article of claim 38, wherein the boot block BIOS portion is stored within a firmware.

40. The article of claim 39, wherein the instructions providing for processing the boot block BIOS portion includes instructions providing for selecting the boot block BIOS portion from a plurality of boot block BIOS portions.

41. The article of claim 40, wherein the instructions providing for selecting the boot block BIOS portion includes instructions providing for selecting the boot block BIOS portion based at least in part upon the success of a previous pre-boot phase.

42. The article of claim 38, wherein the instructions providing for accessing the main BIOS portion includes instructions providing for:
utilizing a service processor to communicate with a blade management agent; and
getting the main BIOS portion from the blade management agent.

43. The article of claim 42, wherein the instructions providing for accessing the main BIOS portion further includes instructions providing for getting the main BIOS portion from an alternative source if a valid main BIOS portion is not provided by a blade management agent.

44. The article of claim 43, wherein the alternative source includes a firmware.

45. The article of claim 42, wherein the instructions providing for getting the main BIOS portion from the blade management agent includes instructions providing for the blade management agent selecting a main BIOS portion from a plurality of main BIOS portions.

46. The article of claim 45, wherein the instructions providing for selecting a main BIOS portion includes instructions providing for loading the main BIOS portion from a device selected from a group consisting of the following:
a remote secure server;
a removable disk;
a non-removable disk; and
a network storage device.

47. The article of claim 45, wherein the instructions providing for selecting a main BIOS portion includes instructions providing for selecting based at least in part upon a criteri on selected from a group consisting of the following:
the success of a previous pre-boot phase;
a date associated with the main BIOS portion; and
a hardware signature associated with a blade card.

48. The article of claim 38, wherein the instructions providing for loading the main BIOS portion includes instructions providing for:
utilizing a service processor to load the main BIOS portion into a local memory device; and
running the main BIOS portion from the memory.

49. The article of claim 48, wherein the instructions providing for utilizing a service processor includes instructions providing for:
verifying that the main BIOS portion is valid by checking a signature associated with the main BIOS portion; and
if the main BIOS portion is not valid, loading an alternative main BIOS portion.

* * * * *

UNITED STATES PATENT AND TRADEMARK OFFICE
CERTIFICATE OF CORRECTION

| | | |
|---|---|---|
| PATENT NO. | : 7,143,279 B2 | |
| APPLICATION NO. | : 10/448696 | |
| DATED | : November 28, 2006 | |
| INVENTOR(S) | : Goud et al. | |

It is certified that error appears in the above-identified patent and that said Letters Patent is hereby corrected as shown below:

In column 7, at line 2, delete "arid" and insert --and--.
In column 7, at line 35, delete "shred" insert --shared--.

Signed and Sealed this

Fourth Day of September, 2007

JON W. DUDAS
*Director of the United States Patent and Trademark Office*